United States Patent
Alon-Braitbart et al.

(10) Patent No.: US 9,709,953 B2
(45) Date of Patent: Jul. 18, 2017

(54) DESPECKLING A COMPUTER GENERATED HOLOGRAM

(71) Applicant: Real View Imaging Ltd., Yokneam (IL)

(72) Inventors: Shlomo Alon-Braitbart, Haifa (IL); Shaul Alexander Gelman, RaAnana (IL); Carmel Rotschild, Ganei-Tikva (IL)

(73) Assignee: Real View Imaging Ltd., Yokneam (IL)

( * ) Notice: Subject to any disclaimer, the term of this patent is extended or adjusted under 35 U.S.C. 154(b) by 44 days.

(21) Appl. No.: 14/418,956

(22) PCT Filed: Jul. 30, 2013

(86) PCT No.: PCT/IL2013/050647
§ 371 (c)(1),
(2) Date: Feb. 2, 2015

(87) PCT Pub. No.: WO2014/020602
PCT Pub. Date: Feb. 6, 2014

(65) Prior Publication Data
US 2015/0234351 A1    Aug. 20, 2015

Related U.S. Application Data

(60) Provisional application No. 61/678,211, filed on Aug. 1, 2012, provisional application No. 61/678,213, filed on Aug. 1, 2012.

(51) Int. Cl.
*G03H 1/32* (2006.01)
*G03H 1/22* (2006.01)

(52) U.S. Cl.
CPC ............. *G03H 1/32* (2013.01); *G03H 1/2205* (2013.01); *G03H 1/2294* (2013.01); *G03H 2001/2239* (2013.01)

(58) Field of Classification Search
CPC ...... G03H 1/32; G03H 1/2205; G03H 1/2294; G03H 2001/2297; G03H 2001/2239
USPC .......................................................... 359/1, 9
See application file for complete search history.

(56) References Cited

U.S. PATENT DOCUMENTS 4,585,297 A    4/1986  Hamaguchi et al.
8,441,703 B2   5/2013  Leister
(Continued)

FOREIGN PATENT DOCUMENTS

WO    WO 2014/020602    2/2014
WO    WO 2014/020603    2/2014

OTHER PUBLICATIONS

Communication Relating to the Results of the Partial International Search Dated Nov. 8, 2013 From the International Searching Authority Re. Application No. PCT/IL2013/050647.
(Continued)

*Primary Examiner* — William R Alexander

(57) ABSTRACT

A method for despeckling the image reproduced by a Computer Generated Hologram (CGH) including reproducing a CGH, and jittering a location of an exit pupil of an optical system through which the CGH is imaged, relative to an observer's input pupil, so as to shift at least some speckles out of the exit pupil. A method for despeckling a Computer Generated Holographic image including computing a first modulation for a first holographic image, and computing a second modulation for a second holographic image of a same holographic image using an initial phase distribution used for calculating the first holographic image as an initial phase distribution used for calculating the second modulation. Related apparatus and methods are also described.

22 Claims, 9 Drawing Sheets

(56) References Cited

U.S. PATENT DOCUMENTS

| | | | | |
|---|---|---|---|---|
| 2010/0097672 | A1* | 4/2010 | Leister | G03H 1/2294 359/9 |
| 2010/0188719 | A1* | 7/2010 | Leister | G03H 1/0808 359/9 |
| 2010/0194745 | A1 | 8/2010 | Leister et al. | |
| 2010/0202725 | A1* | 8/2010 | Popovich | G02B 27/48 385/10 |
| 2011/0063289 | A1 | 3/2011 | Gantz | |
| 2011/0128555 | A1* | 6/2011 | Rotschild | G02B 27/2271 356/625 |
| 2011/0158508 | A1* | 6/2011 | Shpunt | G01B 11/25 382/154 |
| 2011/0317130 | A1* | 12/2011 | Gollier | H04N 9/3129 353/20 |
| 2015/0168914 | A1 | 6/2015 | Gelman et al. | |

OTHER PUBLICATIONS

Communication Relating to the Results of the Partial International Search Dated Dec. 10, 2013 From the International Searching Authority Re. Application No. PCT/IL2013/050648.

International Preliminary Report on Patentability Dated Dec. 2, 2014 From the International Preliminary Examining Authority Re. Application No. PCT/IL2013/050647.

International Preliminary Report on Patentability Dated Dec. 2, 2014 From the International Preliminary Examining Authority Re. Application No. PCT/IL2013/050648.

International Search Report and the Written Opinion Dated Mar. 25, 2014 From the International Searching Authority Re. Application No. PCT/IL2013/050648.

International Search Report and the Written Opinion Dated Jan. 28, 2014 From the International Searching Authority Re. Application No. PCT/IL2013/050647.

Written Opinion Dated Aug. 27, 2014 From the International Preliminary Examining Authority Re. Application No. PCT/IL2013/050647.

Written Opinion Dated Aug. 27, 2014 From the International Preliminary Examining Authority Re. Application No. PCT/IL2013/050648.

Fukaya et al. "Eye-Position Tracking Type Electro-Holographic Display Using Liquid Crystal Devices", Asia Display '95, XP002940561, S36-5: 963-964, Jan. 1, 1995.

Hecht "Geometrical Optics: Stops: Aperture and Field Stops; Entrance and Exit Pupils; Relative Aperture and F-Number", Optics, XP002715216, Chap.5.3: 173-177, 1998. Para [5.3.2], Figs. 5.37, 5.38.

Official Action Dated Feb. 23, 2016 From the U.S. Appl. No. 14/418,994.

Official Action Dated Aug. 23, 2016 From the U.S. Appl. No. 14/418,994.

Applicant-Initiated Interview Summary Dated Nov. 10, 2016 From the U.S. Appl. No. 14/418,994. (3 pages).

* cited by examiner

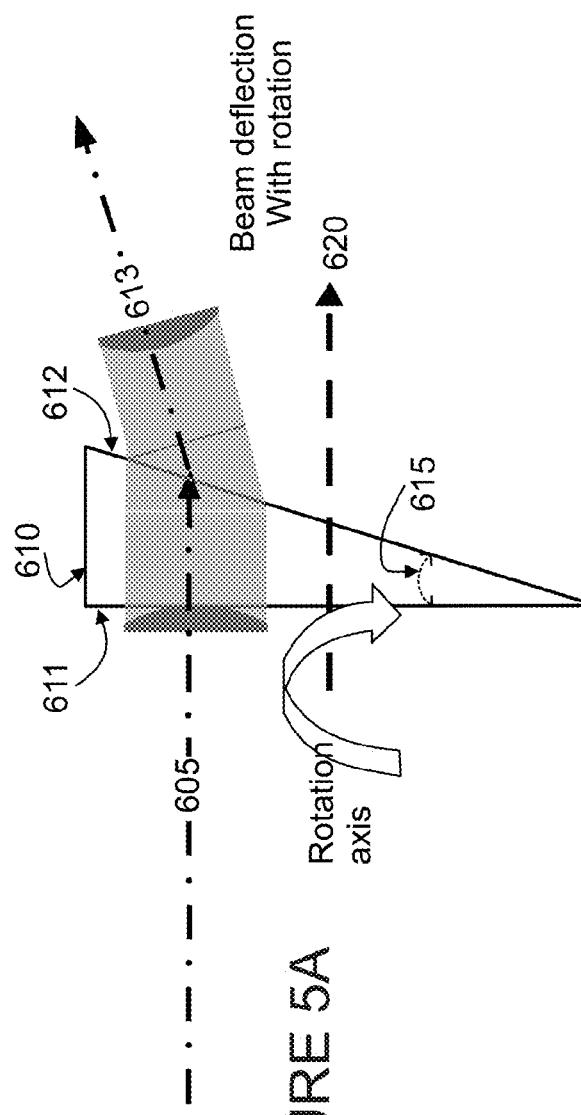
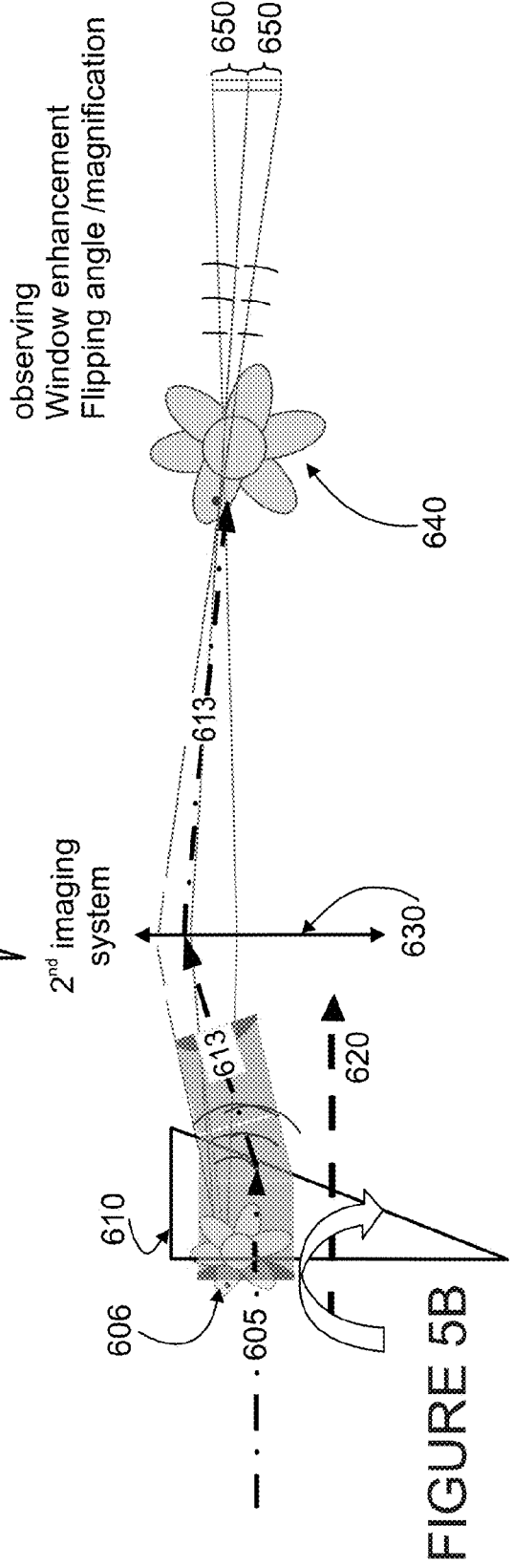
FIGURE 5A
FIGURE 5B

DESPECKLING A COMPUTER GENERATED HOLOGRAM

RELATED APPLICATIONS

This application is a National Phase of PCT Patent Application No. PCT/IL2013/050647 having International filing date of Jul. 30, 2013, which claims the benefit of priority under 35 USC §119(e) of U.S. Provisional Patent Application No. 61/678,213 filed Aug. 1, 2012 and U.S. Provisional Patent Application No. 61/678,211 filed Aug. 1, 2012. The contents of all of the above applications are incorporated by reference as if fully set forth herein in their entirely.

FIELD AND BACKGROUND OF THE INVENTION

The present invention, in some embodiments thereof, relates to Computer Generated Holograms (CGHs) and, more particularly, but not exclusively, to methods and apparatus for despeckling CGHs.

CGHs may be produced by projecting coherent light onto computer controlled Spatial Light Modulators (SLMs). The SLMs include an array of light modulators which are programmed by a computer to modulate light, so that light coming off the SLM (passing through or reflected off the SLM) produces a hologram.

Background art includes:

PCT Published Patent Application WO 2010/004563 by Rotschild et al, which discloses methods and systems for displaying images, and for implementing volumetric user interfaces. One exemplary embodiment provides a system comprising: a light source; an image producing unit, which produces an image upon interaction with light approaching the image producing unit from the light source; an eyepiece; and a mirror, directing light from the image to a surface of the eyepiece, wherein the surface has a shape of a solid of revolution formed by revolving a planar curve at least 180° around an axis of revolution. Another exemplary embodiment provides a method for implementing a floating-in-the-air user interface, including displaying a first image in a display space of a first floating-in-the-air display, inserting a real object into the display space of the first floating-in-the-air display, locating a location of the real object within the display space of the first floating-in-the-air display, locating the real object in the display space, and providing the location as input to the floating-in-the-air user interface;

PCT Published Patent Application WO 2012033174 titled "ILLUMINATION APPARATUS, PROJECTION APPARATUS, AND PROJECTION VIDEO DISPLAY APPARATUS";

U.S. Published Patent Application 2011/0176190, which describes a method for reconstructing a holographic projection comprising providing a single hologram, providing at least one cyclic shift of at least a portion of the single hologram in the space domain, and reconstructing a cyclically shifted hologram by applying said cyclic shift on said portion;

U.S. Published Patent Application 2011/002019, titled "HOLOGRAPHIC IMAGE DISPLAY SYSTEMS", describes an invention which relates to techniques for speckle reduction in holographic optical systems, in particular holographic image display systems. We describe a holographic image display system for displaying an image holographically on a display surface, the system including: a spatial light modulator (SLM) to display a hologram; a light source to illuminate said displayed hologram; projection optics to project light from said illuminated displayed hologram onto said display surface to form a holographically generated two-dimensional image, said projection optics being configured to form, at an intermediate image surface, an intermediate two-dimensional image corresponding to said holographically generated image; a diffuser located at said intermediate image surface; and an actuator mechanically coupled to said diffuser to, in operation, move said diffuser to randomize phases over pixels of said intermediate image to reduce speckle in an image displayed by the system;

U.S. Published Patent Application 2010/194745, titled "Holographic Display Having Improved Reconstruction Quality", discloses is a display for the holographic reconstruction of a three-dimensional scene using means which allow a reduction of speckle patterns. Speckle patterns result in the graining of a holographic reconstruction and worsen the quality thereof. The 3D scene is incoherently superimposed with itself chronologically or spatially in the eye of the observer. The modulated wave fronts of each reconstructed object point of the scene are shifted relative to themselves in the reconstruction beam path and superimposed in the eye of the observer. The shifting may occur one-dimensionally and two-dimensionally. Each object point is multiplied with itself in the eye of the observer in accordance with the number of the shifted wave fronts. The various speckle patterns over which the eye of the observer averages are also multiplied. Speckle patterns are reduced and the reconstruction quality is thus increased in holographic displays;

U.S. Published Patent Application 2010/0097672, which describes a method for reducing speckle patterns of a three-dimensional holographic reconstruction. A controllable light modulator into which a three-dimensional scene is coded is illuminated by coherent light, a reconstruction means projects the modulated light close to an eye position into a space of observation and a control means controls the illumination. This provides a holographic reproduction device in which the speckle patterns occurring during reconstruction of a three-dimensional scene are reduced. Also provided is a next-to-real time method using a carrier medium of conventional image refresh rate;

U.S. Published Patent Application No. 2009/296176 titled "Method and Device for Reducing Speckle" describes a method for reducing speckle patterns of a three-dimensional holographic reconstruction is disclosed. A controllable light modulator into which a hologram of a three-dimensional scene is coded is illuminated by coherent light, a reconstruction lens transforms the modulated light into an eye position and reconstructs the three-dimensional scene in a reconstruction space and a control means controls the illumination. This provides a holographic reproduction device in which the speckle patterns occurring during reconstruction of a three-dimensional scene are reduced. According to one embodiment, a next-to-real time method is presented using a carrier medium of conventional image refresh rate;

U.S. Published Patent Application No. 2009/0040527 titled "METHOD AND APPARATUS FOR SPECKLE NOISE REDUCTION IN ELECTROMAGNETIC INTERFERENCE DETECTION" relates to "Interference measurements obtained by comparison of a same beam (i.e. same nominal polarization, intensity, coherence length and wavelength) striking a same region on a sample at a same angle, but having a different beam wavefront upon intersection with the region are shown to provide images with independent coherent speckle noise patterns. Accordingly a plurality of interference measurements with diverse beam wavefronts can be used to identify or reduce coherent speckle noise. Reduction of the coherent speckle noise can be performed by compounding the aligned images. A change in the beam wavefront may be provided by displacing the sample in the direction of the beam between or during the measurements, when the beam is a focused beam (i.e. converging or diverging)";

U.S. Pat. No. 8,025,410 titled "PROJECTION DEVICE PROVIDING REDUCED SPECKLE CONTRAST" describes a projection device includes a diffuser and a light source system. The light source system includes a light source, a dichroic element, an actuator, and a reflector. The light source generates a light beam that is directed to the dichroic element. The dichroic element forms first and second individual light beams from the light beam. The first individual light beam is transmitted to the diffuser. The second individual light beam is reflected from the reflector to the diffuser. The actuator is fixed to the reflector and has a removal frequency exceeding 20 Hz;

U.S. Pat. No. 7,866,831, titled "Image Projector", describes an image projector realizing image projection with high image quality by reducing speckle noise. An image projector comprising a coherent light source, a collimation lens for transforming coherent light emitted from the coherent light source into coherent parallel light, and a projection optical system for projecting coherent parallel light is further provided with a reflection element for reflecting the coherent parallel light and capable of oscillating in parallel with the direction normal to the reflection plane, and a reflection element drive means for causing oscillatory motion of the reflection element;

U.S. Pat. No. 6,367,935 titled "METHOD AND DEVICE FOR ELIMINATING IMAGE SPECKLES IN SCANNING LASER IMAGE PROJECTION" relates to "a method for the elimination of image speckles in a scanning laser projection is suggested, in which a phase hologram is used for dividing the illumination beam of the projector into partial beams. The partial beams are heterodyned again on the image screen within the image element (pixels) to be projected in such a way that differing speckle patterns are formed which average each other out in the eye of the viewer over time and/or space. Thus, a device is provided especially for the laser projection which substantially eliminates or reduces the speckles at the viewer. However, the beam form and the beam density are hardly or not changed";

U.S. Pat. No. 6,016,210, titled "Scatter noise reduction in holographic storage systems by speckle averaging", describes a method and an apparatus for increasing detection signal-to-noise ratio, while reading out a hologram from a holographic storage medium, are disclosed. The hologram is written by interfering a write reference beam with an object beam. The method comprises the steps of (1) effecting multiple sequential hologram-read operations using multiple read reference beams separated from each other by a separation angle; (2) shifting the detector array contents in between hologram-read operations such that the data signal patterns incident on the detector array are approximately identical but the incident scatter noise patterns are uncorrelated; and (3) integrating the multiple hologram readouts electronically on the detector array. The apparatus comprises a laser source, a beamsteerer, a detector array and a shifting device;

U.S. Pat. No. 4,256,363 titled "SPECKLE SUPPRESSION OF HOLOGAPHIC MICROSCOPY" relates to "an apparatus for, and a method of, reconstructing and viewing a speckled holographic image through a microscope, with the result that the speckle of the holographic image is significantly reduced, without loss of resolution of the image. A finely-structured and transparent light diffuser is interposed thru the aerial image formed by a hologram or an image formed or relayed by a lens system such as a microscope objective prior to the eyepiece. This diffuser is moved in its plane with a rotary or vibratory motion to suppress the speckle";

U.S. Pat. No. 4,155,630 titled "Speckle Elimination By Random Spatial Phase Modulation" relates to "a process and apparatus for improving image creation in a coherent light imagery system which involves directing diffused laser light onto a mirror having a rocking motion that will cause the reflected rays to sweep a two-dimensional area and focusing the reflected light through a diffuser before collimating same for use in image creation. More particularly, this invention creates the rocking motion by applying a combination of voltages to three independent piezo-electric crystals upon which the mirror is mounted"; and An article titled: "Fresnel and Fourier digital holography architectures: a comparison" by Damien P., David S. Monaghan, Nitesh Pandey, Bryan M. Hennelly, and retrieved from the World Wide Web, at eprints(dot)nuim(dot)ie/2468/1/BH_Fresnel_Fourier(dot)pdf.

The disclosures of all references mentioned above and throughout the present specification, as well as the disclosures of all references mentioned in those references, are hereby incorporated herein by reference.

SUMMARY OF THE INVENTION

The present invention, in some embodiments thereof, relates to methods and apparatus for despeckling CGHs.

In some embodiments of the invention, an element in an optical system projecting the CGH is used to jitter, or shift, a direction of projection of an exit pupil of the CGH, so as to cause speckles in an observed image to shift, while objects in a scene of the CGH appear sharp and steady.

In some embodiments of the invention, an element in an optical system projecting the CGH is used to jitter an exit pupil of the optical system along the optical axis/viewing direction, also termed the Z axis, so as to cause speckles to shift, while objects in a scene of the CGH appear sharp and steady.

In some embodiments of the invention, the exit pupil is jittered in a direction of the Z axis by moving an element other than the element which produces jitter in orthogonal/lateral directions relative to the projection direction. In some embodiments, jittering along the Z axis is performed by moving a lens and/or a mirror and/or an optical slab back and forth along the Z axis.

The term "observation window" in all its grammatical forms is used throughout the present specification and claims interchangeably with the term "observing window" and its corresponding grammatical forms.

The image is viewed by the viewer while the observation window is being jittered, but the speckles are swept outside of the viewer's pupil. All (or most) of the time, the viewer sees the image, but most of the time the speckles are outside the viewer's pupil, so the viewer sees a bright image, and an attenuated speckle, if the user sees the speckle at all.

In some embodiments, an observation window of a CGH is larger than a pupil of a viewer, the image is viewed by the viewer while the image is being jittered, but the speckles are swept outside of the viewer's pupil. All (or most) of the time, the viewer sees the image, but most of the time the speckles are outside the viewer's pupil, so the viewer sees a bright image, and an attenuated speckle.

In some embodiments of the invention, the CGH is optionally a shell of a three dimensional object, that is, an image of a surface of the object.

In some embodiments of the invention, the CGH optionally represents several planes of a three dimensional object, that is, a semi transparent image projecting several surfaces that can be seen from a specific direction.

In some embodiments of the invention, the CGH is optionally calculated per eye and its specific direction.

In some embodiments of the invention, when the angle between projection directions of the projected image, is small, the same CGH is optionally presented to the viewer, without compensating for the small shift in viewing direction. A viewer gains the benefit of despeckling, while the image appears to stay put, that is, the image appears to be viewed from the same viewing direction.

In some embodiments of the invention, different CGHs of the same scene are produced, each with a different SLM pattern, so that different speckle patterns are produced superimposed on a same scene. The different speckle patterns average out, while the same scene provides a bright image to a viewer.

In some embodiments of the invention, the different CGHs of the same scene solution are combined with jittering a direction of projection of an exit pupil of the CGHs.

In some embodiments of the invention a shift in the fringe pattern is used to shift speckles away from the pupil location.

According to an aspect of some embodiments of the present invention there is provided a method for despeckling a Computer Generated Hologram (CGH) including producing a CGH, and jittering a location of an exit pupil of an optical system through which the CGH is imaged, relative to an observer's input pupil, so as to shift at least some speckles out of the exit pupil.

According to some embodiments of the invention, the jittering includes shifting the location of an exit pupil laterally relative to a direction of projection of the CGH.

According to some embodiments of the invention, the jittering includes shifting the exit pupil of the optical system used to produce the CGH along a direction of projection of the CGH.

According to some embodiments of the invention, an image of the CGH appears to the observer to be located in the same location when the exit pupil is jittered across the observer's input pupil.

According to some embodiments of the invention, an image of the CGH appears to the observer to be oriented in the same direction when the exit pupil is jittered across the observer's input pupil.

According to some embodiments of the invention, a first CGH is calculated to appear to a first eye of the observer in a first location and oriented in a first direction, and a second CGH is calculated to appear to a second eye of the observer in the same first location and oriented in the same first direction.

According to some embodiments of the invention, the CGH is of a shell of a three dimensional object.

According to some embodiments of the invention, a first CGH is calculated as a shell of a three dimensional object to a point location of a first eye of a viewer, and a second CGH is calculated as a shell of the same three dimensional object to a point location of a second eye of a viewer.

According to some embodiments of the invention, the CGH is of a group of shells of the same three dimensional object. According to some embodiments of the invention, the CGH is of a group of shells of different three dimensional objects. According to some embodiments of the invention, the CGH is of a cloud of voxels as seen from a specific direction, each voxel having a specific transparency.

According to some embodiments of the invention, further including configuring projection optics of the CGH so that the exit pupil of the CGH is larger than an observer's input pupil.

According to some embodiments of the invention, the jittering includes sweeping the exit pupil across an observer's input pupil. According to some embodiments of the invention, the sweeping scans across the observer's input pupil at a rate greater than 1 time per second. According to some embodiments of the invention, the sweeping scans across the observer's input pupil at a rate which is coordinated with a CGH projection rate.

According to some embodiments of the invention, the producing a CGH includes projecting coherent light onto a computer controlled Spatial Light Modulator (SLM), thereby modulating the coherent light.

According to some embodiments of the invention, the observer is a person. According to some embodiments of the invention, the observer is an additional optical system.

According to some embodiments of the invention, the jittering includes deflecting the direction of projecting the CGH by an image deflector placed at a plane of an image of the CGH.

According to some embodiments of the invention, the deflecting includes rotating the image deflector.

According to some embodiments of the invention, the jittering includes deflecting the direction of projecting the CGH by an image deflector placed at a symmetry location of an optical system for projecting the CGH.

According to some embodiments of the invention, the deflecting includes rotating the image deflector.

According to some embodiments of the invention, the jittering includes deflecting a mirror to deflect the direction of projecting the CGH. According to some embodiments of the invention, the jittering includes deflecting a prism to deflect the direction of projecting the CGH. According to some embodiments of the invention, the jittering includes rotating a tilted optical window.

According to an aspect of some embodiments of the present invention there is provided a method of despeckling a Computer Generated Hologram (CGH) including producing a CGH by projecting coherent light onto a computer controlled Spatial Light Modulator (SLM), thereby modulating the coherent light and producing a CGH, re-imaging a first image produced by the CGH in a first direction, and deflecting the first direction by changing a direction of a light deflector located at a location of the first image, so as to shift at least some speckles out of an exit pupil of an optical system through which the CGH is imaged.

According to some embodiments of the invention, the deflecting includes deflecting the direction in one dimension. According to some embodiments of the invention, the deflecting includes deflecting the direction in two dimensions.

According to some embodiments of the invention, for each one of a plurality of different deflected instances of the first direction, a different CGH is produced by the SLM, so as to project a same scene viewed from a corresponding deflected instance of the first direction.

According to some embodiments of the invention, the light deflector is a prism located between the image and an exit pupil.

According to some embodiments of the invention, the CGH is a Fourier hologram, and the light deflector is a tilted optical window located between the SLM and a focusing lens of the Fourier hologram.

According to some embodiments of the invention, the CGH is of a shell of a three dimensional object.

According to some embodiments of the invention, if the deflecting is by an angle smaller than a threshold angle, the modulation of the light by the SLM is not changed to compensate for the change in direction.

According to some embodiments of the invention, the SLM is controlled so as to produce a CGH of a shell relative to an observation point at an approximate distance to an observer. According to some embodiments of the invention, the SLM is controlled so as to produce a CGH of a shell relative to a vector.

According to an aspect of some embodiments of the present invention there is provided a method of despeckling a Computer Generated Hologram (CGH) including producing a CGH by projecting coherent light onto a computer controlled Spatial Light Modulator (SLM), thereby modulating the coherent light and producing a CGH, imaging an image produced by the CGH to a first location, imaging the SLM to an exit pupil of an optical system through which the CGH is imaged, and jittering the image of the SLM along a direction of the exit pupil, while maintaining the CGH image substantially at the first location, so as to shift at least some speckles out of the exit pupil.

According to some embodiments of the invention, the jittering includes jittering in three dimensions.

According to an aspect of some embodiments of the present invention there is provided apparatus for despeckling a Computer Generated Hologram (CGH), including a computer controlled Spatial Light Modulator (SLM) for modulating coherent light and producing a first image of a CGH, an optical system for reimaging the first image from a first location to a second location, and a light deflector for moving the second location, so as to shift at least some speckles out of an exit pupil of the optical system.

According to some embodiments of the invention, configured so that an image of the CGH appears to a static observer in the same viewing direction when the second location is moved.

According to some embodiments of the invention, the light deflector is placed at a symmetry location of an optical system for projecting the first image.

According to some embodiments of the invention, the light deflector is located at a location of the first image.

According to some embodiments of the invention, the light deflector is adapted to deflect light in one dimension. According to some embodiments of the invention, the light deflector is adapted to deflect light in two dimensions. According to some embodiments of the invention, the light deflector is adapted to deflect light in three dimensions.

According to some embodiments of the invention, further including a control unit configured to accept a specific amount of speckle attenuation and to control the light deflector to provide the specific amount of attenuation.

According to an aspect of some embodiments of the present invention there is provided apparatus for despeckling a Computer Generated Hologram (CGH), including a computer controlled Spatial Light Modulator (SLM) for modulating coherent light and producing a first image of a CGH, and an optical system for reimaging the first image from a first location to a second location, including means for moving an exit pupil of the apparatus relative to an input pupil of an observer, so as to shift at least some speckles out of the input.

According to some embodiments of the invention, the moving includes shifting the location of the exit pupil laterally relative to a direction of projection of the CGH.

According to some embodiments of the invention, the moving includes shifting the exit pupil of the optical system used to produce the CGH along a direction of projection of the CGH.

According to an aspect of some embodiments of the present invention there is provided a method of despeckling a Computer Generated Hologram (CGH) including computing a first modulation of a first holographic image for input to a Spatial Light Modulator (SLM) for use in displaying a first CGH of the first holographic image, computing a second modulation of the first holographic image for input to the SLM for use in displaying a second CGH of the first holographic image, and alternating between using the first modulation and the second modulation in order to display a CGH of the first holographic image.

According to some embodiments of the invention, the computing a first modulation and the computing a second modulation each include: (a) computing, at an image plane, an initial amplitude distribution which corresponds to the first holographic image, also having an initial phase distribution, (b) computing the initial amplitude and phase distribution back through an optical system to a plane of the SLM, producing an initial amplitude and phase distribution at the SLM, (c) taking only the phase distribution at the SLM plane, and computing forward through the optical system to the image plane, producing an image having an amplitude and phase distribution, (d) iterating (b) and (c) until the phase distribution at the SLM plane produces an amplitude distribution at the image plane which differs by less than a threshold value from the initial amplitude distribution of the first holographic image.

According to some embodiments of the invention, the initial phase distribution of the second modulation at the image plane includes the same initial phase distribution as the initial phase distribution of the first modulation.

According to some embodiments of the invention, the computing a second modulation includes computing a plurality of additional modulations of the first holographic image for input to the SLM for use in displaying a plurality of additional CGHs of the first holographic image, and the alternating use of the first modulation and the second modulation includes using the first modulation and the plurality of additional modulations by the SLM in order to display the CGH of the first holographic image.

According to an aspect of some embodiments of the present invention there is provided a method for despeckling a Computer Generated Holographic movie including computing a first modulation of a first holographic image in a holographic movie, and computing a second modulation of a second holographic image using an initial phase distribution used for calculating the first holographic image as an initial phase distribution used for calculating the second modulation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5A is a simplified illustration of what happens to light shining through a rotating prism;

FIG. 5B is a simplified illustration of a prism being used to shift an observation window of a CGH according to an example embodiment of the invention;

DESCRIPTION OF SPECIFIC EMBODIMENTS OF THE INVENTION

Figure 1:
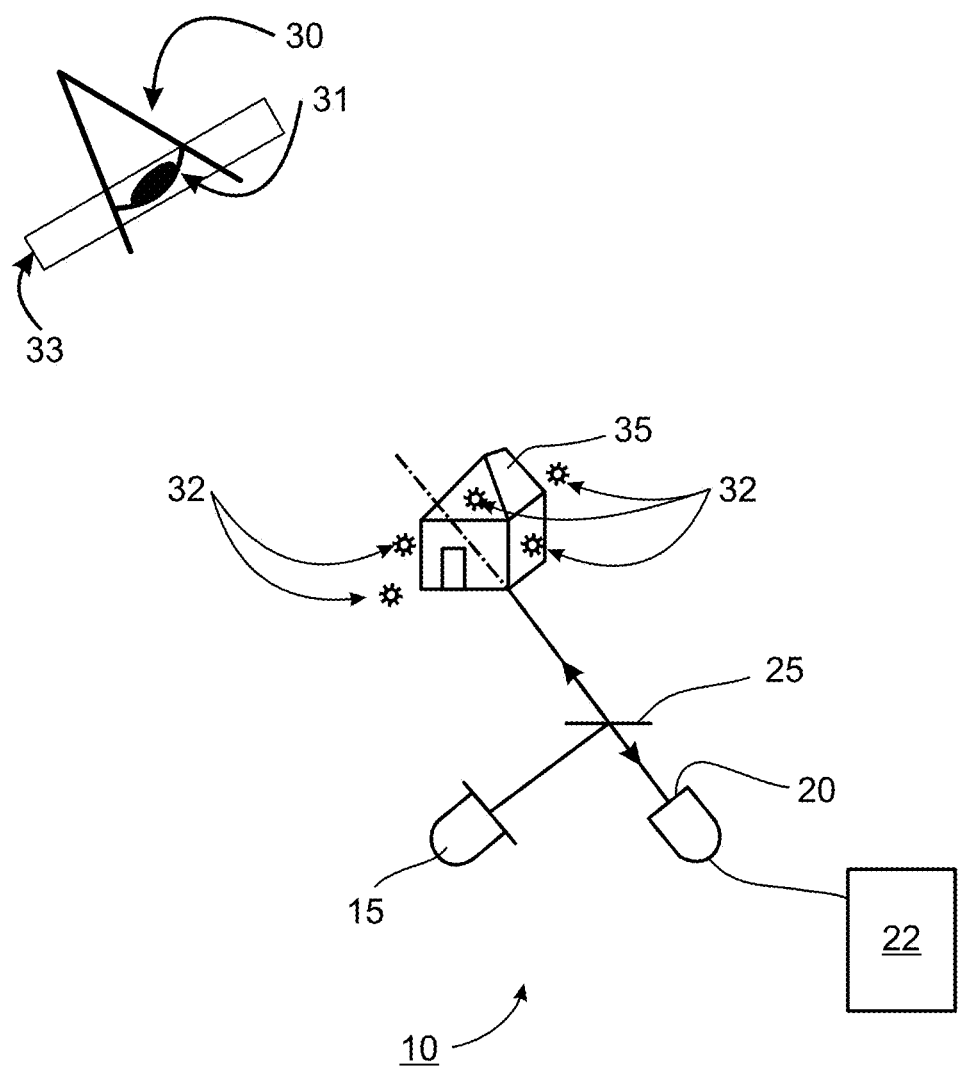
FIG. 1 is a simplified illustration of an example embodiment of a computerized hologram generation unit, constructed according to an example embodiment of the invention.

The present invention, in some embodiments thereof, relates to Computer Generated Holograms (CGHs) and, more particularly, but not exclusively, to methods and apparatus for despeckling CGHs.

A Spatial Light Modulator (SLM) is an object that imposes some form of spatially varying modulation on a beam of light. A SLM is typically used to produce CGHs.

Usually, an SLM modulates the intensity of the light beam. However, it is also possible to produce devices that modulate the phase of the beam or both the intensity and the phase simultaneously.

The term SLM is used herein to describe a device which is used to produce holograms. In some embodiments, the device is an SLM which modulates light which illuminates the SLM, acting by reflection or by transmission, however, the term is also meant to also include an array which both produces light and modulates the light in order to produce a CGH.

The terms "CGH" and "hologram" are used throughout the present specification and claims to mean any type of computer generated hologram and/or hologram, including, by way of a non-limiting example, Fourier holograms and/or Fresnel holograms.

An ideal SLM for computer generated holograms would consist of pixels smaller than a wavelength of light with highly adjustable phase and brightness. However, when non-ideal SLMs are used to produce holograms, less than full control over phase and/or amplitude of modulation of a light beam are achieved. One result of such less than full control is that a CGH image is viewed with an overlay of bright speckles.

Since light waves are defined by both amplitude and phase, CGHs are often not uniquely defined.

In some cases a CGH generates a desired amplitude distribution, while leaving the phase random. The random phase generates noise in the CGH. The random-phase-generated random noise is perceived as speckles.

Speckles reduce image quality of a perceived imaged.

In some embodiments of the invention, an element in an optical system producing the CGH is used to move a location of an observation window of the CGH, so as to cause speckles in an observed image to shift enough so as to be less or not noticed by a viewer, while objects in a scene of the CGH appear sharp and steady.

In some embodiments of the invention, an element in an optical system producing the CGH is used to jitter, or cyclically deflect, a direction of projection of an observation window of the CGH, so as to cause speckles in an observed image to shift enough so as to be less or not noticed by a viewer, while objects in a scene of the CGH appear sharp and steady.

In some embodiments of the invention, the CGH is a Fourier hologram, for example as described in the above-mentioned article titled: "Fresnel and Fourier digital holography architectures: a comparison". In such embodiments, a lateral shift of a modulation pattern of the SLM becomes an angular tilt centered at the Fourier plane, that is, the focal plane of the SLM. In some embodiments of the invention the lateral shift is optionally generated by rotating a tilted optical window located between the SLM and the viewer.

When an observation window of a CGH is larger than a pupil of a viewer, the image is viewed by the viewer while the image is being jittered, but the speckles are swept outside of the viewer's pupil. All (or most) of the time, the viewer sees the image, but most of the time the speckles are outside the viewer's pupil, so the viewer sees a bright image, and an attenuated speckle.

In some embodiments, an unexpected result is observed: jittering the image does not cause a smearing of the image and the speckles, leaving the image well defined, and the speckles hardly visible, because the image hardly moves, while the speckles move further, out of the viewer's pupil. The effect is further described below, with reference to FIG. 2B.

In some embodiments of the invention, the jittering is performed at a rate which is high enough so as not to be noticed by a viewer. Such a rate can be, by way of a non-limiting example, 1 cycle per second, 24 cycles per second or higher, that is a cinematic projection rate or higher, 50 cycles per second or higher, or even 100 cycles per second or higher.

In some embodiments, a series of CGHs is projected, each CGH being replaced by a successive CGH, as a computer generated holographic (CGH) movie. In some embodiments, a projection rate of the CGHs can be, by way of a non-limiting example, 20 or 24 cycles per second or higher, that is a cinematic projection rate or higher, 50 cycles per second or higher, or even 100 cycles per second or higher.

In some embodiments of the invention, the jittering rate is correlated to the CGH projection rate.

In some embodiments of the invention an observation window of the CGH is larger than a viewer's pupil, and the jittering is performed such that the observation window fully overlaps the viewer's pupil at all times, even while shifting.

In some embodiments of the invention an eye tracking system directs a direction of projection of the observation window, even while a jittering mechanism shifts the observation window while overlapping the viewer's pupil.

In some embodiments of the invention the observation window of the CGH is approximately 8 millimeters on a side. In some embodiments of the invention the observation window of the CGH is approximately 30 millimeters on a side.

In some embodiments of the invention, the CGH changes over time, showing successive CGHs of a moving object, similar to frames in a movie or video. Changing SLM modulations between successive CGHs, especially when specific pixels need to make a large change in their modulation property (e.g. a large phase change), may cause appearance of speckles. The pixels requiring a large change may not be able to complete the change between successive CGHs, and one or more pixels which do not reach their required value may produce images of one or more speckles, and/or even a ghost image of the previous CGH (frame).

In some embodiments, successive SLM modulations, for producing successive CGHs, are computed so as to minimize changes in pixels between modulations.

Reference is now made to FIG. 1, which is a simplified illustration of an example embodiment of a computerized hologram generation unit 10, constructed according to an example embodiment of the invention. The example hologram generation unit 10 includes a coherent light source 15, and a spatial light modulator (SLM) 20.

The SLM 20 is connected to a computerized control unit 22, which controls the optical behavior of separate pixels of the SLM 20, so that light reflected off the SLM 20 reproduces a light field front emanating from a scene. FIG. 1 depicts an example image 35 which depicts a house.

In the example embodiment of FIG. 1, light going from the light source 15 is deflected with a beam splitter 25, goes to the SLM 20, and is reflected from the SLM to create a holographic real image 35. Upon reflection the beam passes once again through the beam splitter 25.

FIG. 1 also depicts a viewer's eye 30, including a viewer's pupil 31, looking at the image 35, and seeing speckles 32 at different locations in the image 35.

The computerized hologram generation unit 10 defines an observation window 33 from which the image 35 may be seen. The observation window 33 is what is termed the exit pupil of the optical system of the computerized hologram generation unit 10.

The observation window 33 is optionally an image, through the optical system of the computerized hologram generation unit 10, of the SLM 20.

The viewer's pupil 31 defines an input pupil for the viewer's eye, which is the system observing the CGH projected by the computerized hologram generation unit 10.

The computerized hologram generation unit 10 is optionally optically configured to define the observation window 33 to be larger than the viewer's pupil 31.

It is noted that the input pupil of FIG. 1 is depicted as a person's pupil, however, the input pupil may optionally be another optical system, and/or an electronic system, and/or any sensor system viewing the CGH.

It is noted that the example of FIG. 1 depicts a reflective SLM. In some embodiments of a computerized hologram generation unit, a transmissive SLM (not shown) may be used, in which case the light is optionally not reflected by a beam splitter.

It is noted that the computerized hologram generation unit depicted in the example embodiment of FIG. 1 produces a real image 35 which is seen via the observation window 33.

It is noted that the speckles 32 are spurious images of noise, which is not necessarily, and usually is not, at a same plane as the objects imaged by the CGH.

In some embodiments of the invention, an optical system projecting the CGH is used to jitter, or cyclically deflect, a direction of projection of the CGH, so as to cause an observation window of the CGH to be seen from a broader area than a CGH with a steady projection direction may be seen.

The jittering may cause the image 35 to shift a little, but speckles which are away from the center of rotation shift much more. The eye optionally sees the same image all the time, or optionally most of the time, while the speckle pattern is shifting, and is most of the time outside the viewer's pupil, and averages out.

In some embodiments of the invention, an element in an optical system projecting the CGH is used to jitter, or cyclically deflect, or shift, a direction of projection of the CGH, so as to cause the observation window 33 of the CGH to be seen from a broader area than a steady direction may be seen. Such embodiments are termed herein shifted observation window embodiments.

When the observation window 33 is swept across the pupil 31, the image 35 is still seen from any part of the observation window, as long as the pupil 31 is within the observation window 33. However, the speckles 32 are interference patterns of specific locations of the SLM, and the speckle pattern is different when viewed from different locations in the observation window 33. Therefore some speckles which were in the viewer's pupil 31 are outside the viewer's pupil 31 when the observation window 33 is swept across the viewer's pupil 31. The viewer's sees the image 35 all or most of the time, and the speckles are moving around, optionally spending most of the time outside the pupil 31. So the image 35 remains bright, while the speckles are rarely viewed in the same place, and are mostly outside the viewer's pupil, and so the speckles become dim. Optionally, speckles which produce background noise are averaged out, resulting in a smoother, less noisy image.

The optical system of the computerized hologram generation unit 10 is optionally configured so that the image 35 does not shift, or shifts very little, while the observation window 33 is being shifted, as will be demonstrated further below with reference to example embodiments of FIGS. 2A, 2B, 3A, 3B, 4, 5A, 5B, 6, 7, 8.

In some embodiments, a speckle is only within the observer pupil 31 a fraction of the time. In some embodiments the fraction is, for example, 5% of the time, 15% of the time, 25% of the time, 50% of the time.

It is noted that a speckle which, under conditions of no jittering, is at an edge of the observation window 33 may be outside the observer's pupil 31, under jittering, for a longer period of time than a speckle which is at a center of the observation window 33. In some embodiments, speckle attenuation is expressed as an average over the observation window 33 of the above fraction.

In some embodiments, a controller (not shown) is included, such that the controller accepts an input specifying by how much to attenuate speckles, for example what percentage of the time a speckle may be within the observer's pupil 31, and the controller controls the shifting of the observation window 33 so that the attenuation is achieved.

Various elements are used for causing the observation window of the CGH to jitter.

In some embodiments of the invention, a mirror in the optical system vibrates, causing the observation window of the CGH to jitter. The vibration may be in one dimension, stretching the observation window in one direction, or the vibration may be in two dimensions, stretching the observation window in two directions.

Various methods are used for causing a mirror to vibrate. The mirror may be mounted on an electrically controlled rotatable mount, which rotates the mirror about one dimension, or two mounts, in two directions. The mirror may be mounted with a hinge on one edge and an actuator on another edge. Movement of the mirror may a cyclical movement at a more or less fixed frequency, optionally a frequency determined by mechanical properties of the mirror element, and or determined by full electrical control of movement of the mirror. Optionally the rotation/jittering rate is correlated to the projection rate of the SLM.

In some embodiments of the invention, a prism in the optical path vibrates or rotates, causing the CGH to jitter. If a rotating prism is used, the rotation may optionally be at a fixed rate.

In some embodiments of the invention, a tilted optical window in the optical path vibrates or rotates, causing the CGH to jitter. The tilted optical window is tilted with respect to the optical axis of the optical system. If a rotating tilted optical window is used, the rotation may optionally be at a fixed rate.

In some embodiments of the invention, a lens, or some other optical element in the optical path vibrates or rotates, causing the CGH to jitter. If a rotating lens is used, the rotation may optionally be at a fixed rate.

In some embodiments of the invention an axis of symmetry of the real image of an object in the CGH, if such an axis exists, is projected to coincide with an axis of rotation of the mirror. In such an embodiment, the vibration of the mirror is not visible to a viewer, yet the speckle pattern still shifts.

In some embodiments of the invention a center of the real image of an object in the CGH is projected to coincide with an axis of rotation of the mirror. In such an embodiment, the vibration of the mirror is minimally viewable by a viewer, and the viewer typically accepts such vibration without noticing, yet the speckle pattern still shifts.

In some embodiments of the invention, the CGH is optionally of a shell of a three dimensional object, that is, an image of a surface of the object.

When viewing a three dimensional object which rotates or shifts, an eye may view some parts of the object occluding other parts. The occlusion provides hints as to the three dimensional structure of the object. When viewing an image shell which is being jittered, there is a choice: either present the same image for all jittered viewing directions, or display an image in which image shell is rotated corresponding to the jittering.

In some embodiments of the invention, the same image is presented for all jittered viewing directions. The eye does not receive the depth hints which come from occlusion, and so some indications that the object is rotating are missing, and the mind accepts the image shell better than if the depth hints were there. However, the speckles disappear, and a jittered image shell looks good.

In some embodiments the shell is computed by the computer to be a shell to a vector, that is, a shell computed as if a viewer is far distant.

In some embodiments the shell is computed by the computer to be a shell to a specific point, that is, a shell computed as if a viewer is at a specific point, a specific distance away from an object displayed in the CGH.

In some embodiments the shell is computed by the computer to be a shell to a specific point, which is exactly the distance of the viewer's eye from the image in the CGH.

In some embodiments the shell is computed by the computer to be a shell to a specific point.

In some embodiments a first shell is computed by the computer to be a shell to a first eye of a viewer, and a second shell is computed by the computer to be a shell to a second eye of the viewer. In some embodiments, the first shell is projected to the first eye of the viewer and the second shell is projected to the second eye of the viewer.

In some embodiments multiple shells are computed by the computer to be all shells to a specific point, that is, shells are computed as if a viewer is at a specific point, a specific distance away from an object displayed in the CGH. Optionally, some of the shells are transparent thus the viewer can see images within images or images beyond/ahead of other images.

In some embodiments a cloud of voxels is computed by the computer, each voxel containing a transparency attribute. Voxels are computed as if a viewer is at a specific point, a specific distance away from an object displayed in the CGH. Optionally, some of the voxels are imaged at different planes, and, based on their transparency attribute, allow a user to view images within images or through images, or alternatively multiple layers of an object.

Before explaining at least one embodiment of the invention in more detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

Example Embodiments of Shifting the Observation Window

Reference is now made again to FIG. 1. In some embodiments of the invention, the entire computerized hologram generation unit 10 projecting the CGH is vibrated, or jittered, so as to cyclically deflect a direction of projection of the real image 35, causing the observation window to be seen from a broader area than a steady direction may be seen.

Example Embodiments of Shifting the Observation Window Using a Mirror

Figure 2A:
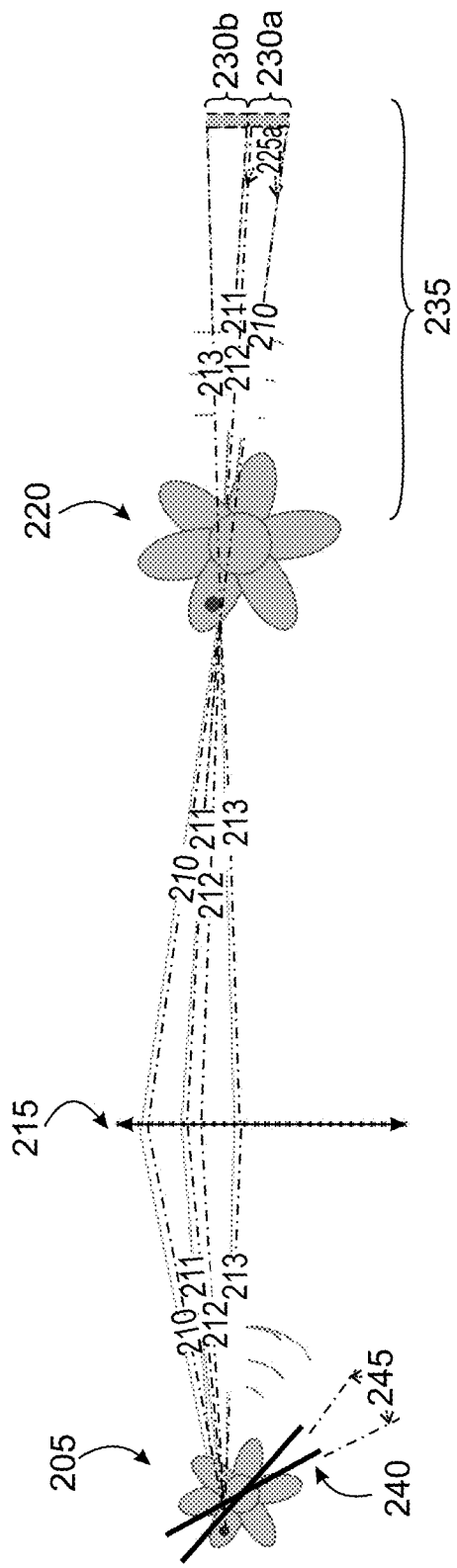
FIG. 2A is a simplified illustration of a real image and some elements of an optical system used to jitter a projection direction of a real image of a CGH, thereby enlarging an observation window of the CGH according to an example embodiment of the invention.

Reference is now made to FIG. 2A, which is a simplified illustration of a real image 205 and some elements of an optical system used to jitter a projection direction of a real image of a CGH, thereby enlarging an observation window of the CGH according to an example embodiment of the invention.

FIG. 2A depicts a first real image 205, a first ray 210 and a second ray 211 projected from a point in the real image 205, through an optical system 215, and reimaged at a point in a second real image 220.

The optical system 215 provides two functions: the optical system 215 reimages the first real image 205 to a wide viewing space; and the optical system 215 reimages the SLM which is used to produce the CGH, defining the observation window of the CGH.

Continuing the first ray 210 and the second ray 211 beyond the second real image 220 provides an indication of an angular extent 225a of an observation window 230a of the second real image 220 of the CGH. When the second real image 220 is viewed from a distance 235, the angular extent 225a of the observation window of the second real image 220 of the CGH defines a size of the observation window 230a.

It is noted that the optical system 215 may optionally magnify the first real image 205. This is useful for observing a CGH, since the first real image 205 may be small, and it may be desired that the second real image 220 be larger than the first real image 205, and viewable from a distance. In such a case the optical system 215 optionally has a large numerical aperture in viewing the first real image 205, while observing the second real image 220 is done via a small observation window, that is, the observing has a small numerical aperture. The size of the observation window is a size of an image of a source of the hologram, for example an image of an SLM.

The example embodiment of FIG. 2A also includes an optical element, for example a mirror 240, which rotates by an angle 245, used to shift the projection direction of the first ray 210 and the second ray 211 of the first real image 205, producing a third ray 212 and a fourth ray 213 thereby illustrating a shifting of the observation window 230a to a second position 230b, corresponding to the angle 245 which the mirror 240 rotated.

Rotating the mirror 240 causes the observing window location to be swept across an observer's pupil while having little effect on apparent image sharpness, yet producing an increase in the effective size of the observing window, and sweeping the observing window across the viewer's pupil.

When the mirror 245 is rotated, optionally back and forth, the observation window 230 sweeps back and forth, enlarging the area from which the viewer can observe the CGH at least part of the time. The viewer's brain being what it is, the viewer observes an image which may be flickering. The flickering is optionally performed at a rate which enables the brain to disregard the flickering and see a constant image.

The mirror 240 is optionally placed more or less at a location of the first real image 205, so that rotation of the mirror 240 does not cause the first real image 205 to appear to shift laterally, only to rotate by the angle 245.

The observing window 230 is shifted by an angle which is equal to the angle 245 of rotation of the mirror 240, divided by the magnification of the optical system 215. The second real image 220 is viewed as relatively sharp because the rotating angle of the second real image 220 is small and is in the plane of the second real image 220.

The observation window 230 is an exit pupil of the optical system producing the hologram.

In some embodiments of the invention, the first real image 205 is optionally of a shell of a three dimensional object, that is, an image of a surface of the object. For example, the first real image is optionally of a surface of a flower as seen from the direction of the rays.

In some embodiments the shell is computed by the computer to be a shell as visible to a viewer who is far distant. For example, a shell computed to a direction midway between the first ray 210 and the second ray 211. Since the first real image 205 is a shell of an object, when the image 205 is rotated, the image 205 does not provide a viewer with depth cues in form of edges of the shell sometimes occluding other parts of the shell and sometimes not. The viewer uses the larger observation window, without the viewer suffering from appearance and disappearance of depth cues caused by the vibration.

In some embodiments the shell is computed by the computer to be a shell to a specific point, that is, a shell computed as if a viewer is at a specific point, a specific distance away from the first real image 205. For example, a distance is optionally chosen by taking the distance 235 from which a viewer views the second real image 220, and modifying the distance 235 by reversing effects of the optical system 215 to produce a second distance (not shown) from the first real image 205.

In some embodiments the shell is computed by the computer to be a shell to a specific point, which is exactly the distance 235 of the viewer's eye from the image in the CGH.

In some embodiments a first shell is computed by the computer to be a shell to a first eye (not shown) of a viewer, and a second shell is computed by the computer to be a shell to a second eye (not shown) of the viewer. In some embodiments, the first shell is projected to the first eye of the viewer and the second shell is projected to the second eye of the viewer.

In some embodiments multiple shells are computed by the computer to be all shells to a specific point, that is, shells are computed as if a viewer is at a specific point, a specific distance away from an object displayed in the CGH. Optionally, some of the shells are transparent thus the viewer can see images within images or images beyond/ahead of other images.

In some embodiments a cloud of voxels is computed by the computer, each voxel containing a transparency attribute. Voxels are computed as if a viewer is at a specific point, a specific distance away from an object displayed in the CGH. Optionally, some of the voxels are imaged at different planes, and, based on their transparency attribute, allow a user to view images within images or through images, or alternatively multiple layers of an object.

Figure 2B:
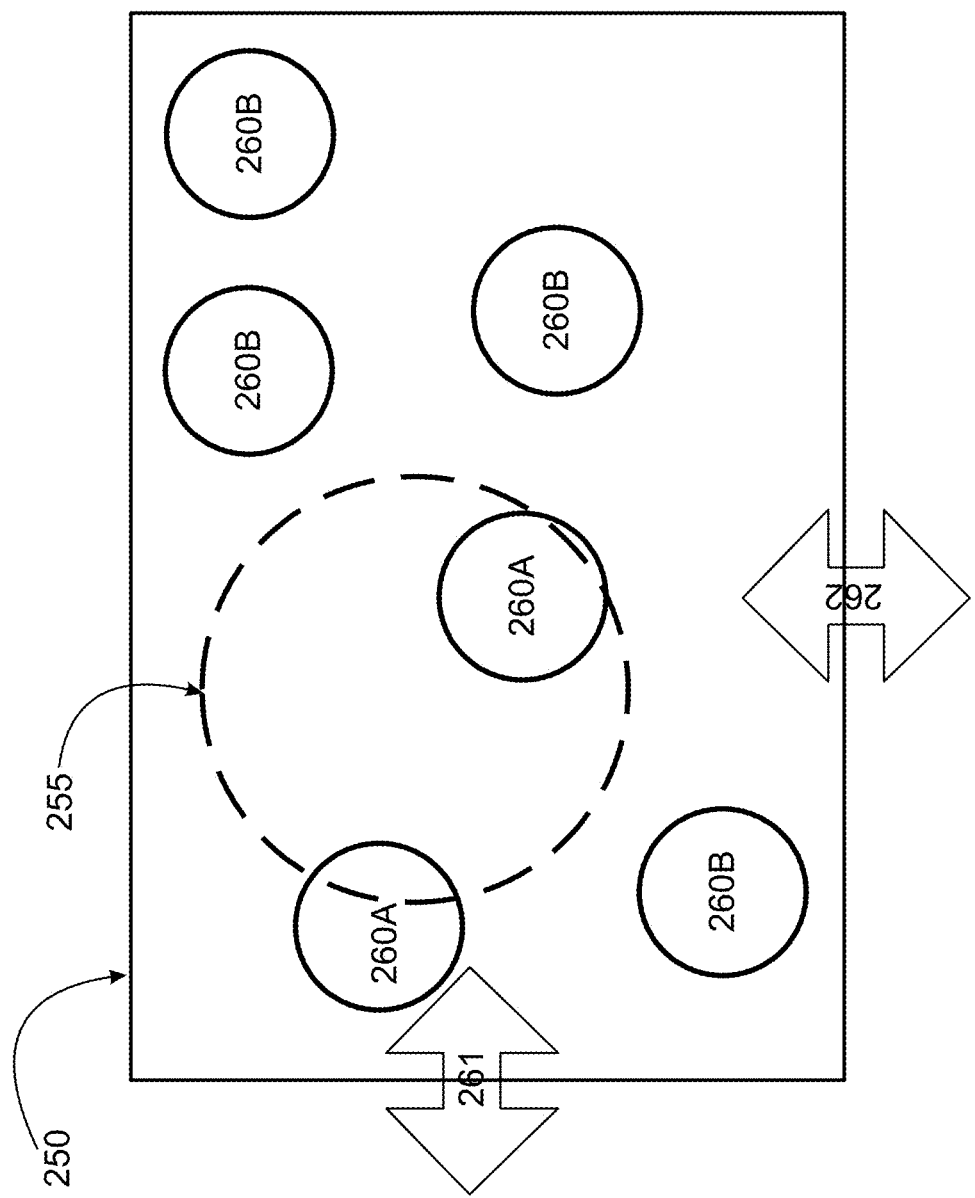
FIG. 2B is a simplified illustration of an observation window of a CGH produced according to an example embodiment of the invention, as seen from a viewer's point of view.

Reference is now made to FIG. 2B, which is a simplified illustration of an observation window 250 of a CGH produced according to an example embodiment of the invention, as seen from a viewer's point of view.

FIG. 2B depicts a qualitative representation of a rectangular observation window 250 of a CGH, on which are also depicted a viewer's pupil 255 (which could be part of an input pupil of an optical system) and observation windows of speckles 260A 260B produced in the course of producing a CGH by an embodiment of the invention.

In some embodiments an observation space may be defined, having a volume extending before and after the observation window, with respect to a viewer-image direction.

A relative size is qualitatively maintained between the observation window 250, the pupil 255, and the observation windows of the speckles 260A 260B.

FIG. 2B depicts some observation windows of speckles 260A which overlap at least some of the pupil 255, which means that the viewer sees speckles which correspond to the observation windows 260A, and some observation windows of speckles 260B which do not overlap the pupil 255, and their corresponding speckles are not seen by the viewer.

When the observation window 250 is jittered, or swept, across the pupil 255, some observation windows of speckles 260A move out of the pupil 255, and some observation windows of speckles 260B move into the pupil 255. When the observation window 250 is swept across the pupil 255 so that the pupil 255 is within the observation window 250 all, or at least most of the time, the CGH is seen by the viewer as a bright image. However, the sweeping of the observation window 250 causes the observation windows of the speckles 260A 260B to be seen only part of the time, and thus the speckles appear to the viewer to be dimmer than if the observation window 250 was steady relative to the pupil 250.

Arrows 261 and 262 depict the possibility of the observation window 250 moving in two perpendicular directions in order to effect a two dimensional sweep of the observation window 250. It is noted that any sweep of the window may be effective, such as a one-dimensional sweep in one direction, or a circular sweep, or even a random sweep, or even a sweep that includes movement in the depth direction that is on the third dimension.

In some embodiments, a range of moving the observation window 250 relative to the pupil 255 is such that the pupil 255 is always entirely inside the observation window 250.

In some embodiments, a range of moving the observation window 250 is such that a first observation window 250 always has some overlap with a second, shifted observation window 250. In such embodiments, if the movement of the observation window 250 is along one direction, an area covered by the observation window 250 is doubled. In such embodiments, if the movement of the observation window 250 is along two perpendicular directions, an area covered by the observation window 250 is quadrupled.

A more detailed description of an example embodiment of the invention is now provided. The example embodiment of the invention described herein is embedded in an example embodiment of a system for broad viewing angle displays and user interfaces as described in above-mentioned PCT published patent application WO 2010/004563 by Rotschild et al.

Figure 3A:
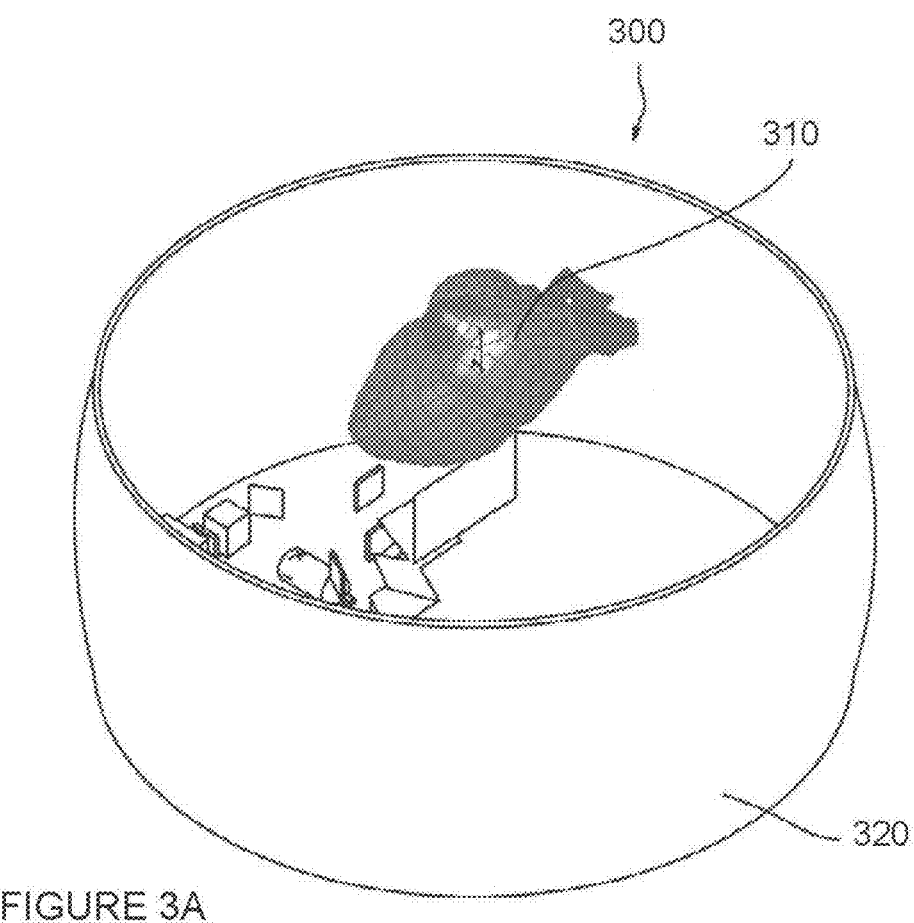
FIG. 3A is a simplified pictorial presentation of an example 360° walk-around image projection system according to an embodiment of the invention.

Reference is now made to FIG. 3A, which is a simplified pictorial presentation of an example 360° walk-around image projection system according to an embodiment of the invention.

FIG. 3A depicts a system 300 showing an image 310 of a heart shown floating in the air. FIG. 3A depicts an eyepiece 320, which optionally has an inner reflective surface shaped as a paraboloid of rotation. Optionally, a vertical cross-section in the eyepiece 320 has a shape of a parabola, and a horizontal cross-section has a shape of a circle.

The eyepiece 320 functionally corresponds to the optical system 215 of FIG. 2A, re-imaging a first real image of a CGH (not shown in FIG. 2A) to a second real image of the CGH, which is the image 310.

Figure 3B:
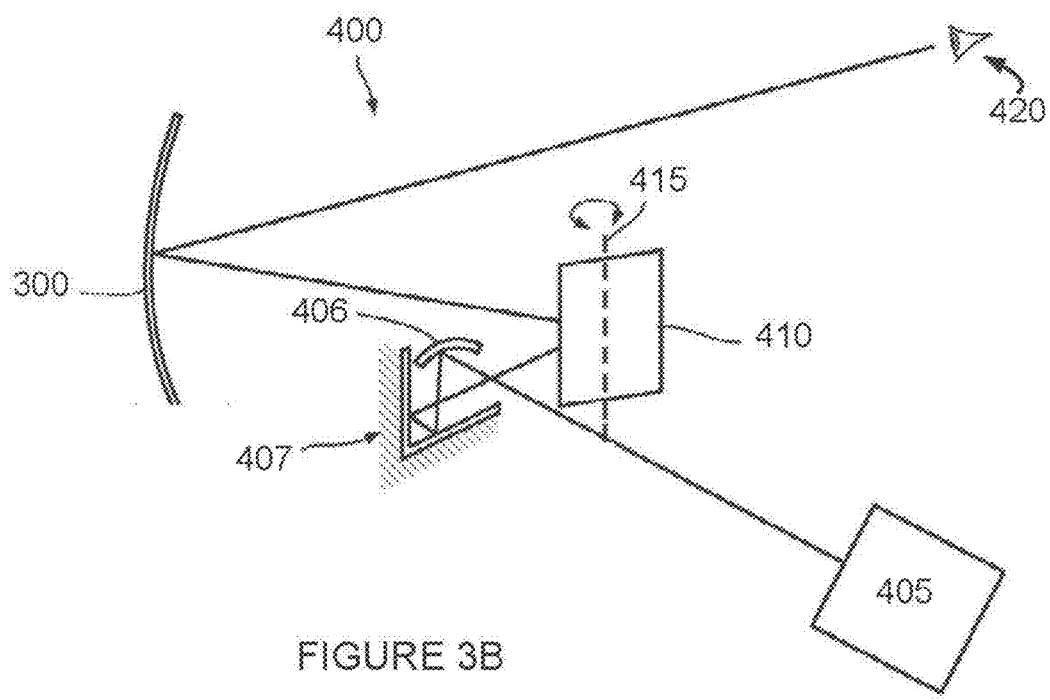
FIG. 3B is an additional simplified illustration of the system of FIG. 3A.

Reference is now also made to FIG. 3B, which is an additional simplified illustration of the system of FIG. 3A.

FIG. 3B depicts a sub-system 400 of the system 300 of FIG. 3A. A few details of the sub-system 400 are depicted in FIG. 3B: an SLM 405; a curved mirror 406 acting as an objective to the eyepiece 320 of FIG. 3A, also depicted in FIG. 3B, used for redirecting rays from the SLM 405; a V-shaped mirror 407 having two mirror surface used for redirecting rays from the curved mirror 406; a rotatable mirror 410 which can rotate or revolve around its axis 415, used for redirecting rays from the V-shaped mirror 407; and the eyepiece 320 also depicted in FIG. 3A, used for redirecting rays from the rotatable mirror 410 to a viewer's eye 420.

When the mirror 410 rotates back and forth, for example, by some specific angle, the mirror 410 shifts an observation window (not shown) across the viewer's pupil.

In some embodiments of the invention the rotation of the mirror 410 is computer controlled.

In some embodiments of the invention, the viewer's eye 420 is tracked by an eye-tracking sub-system (not shown), and the observation window (not shown) is swept across the viewer's eye 420.

FIG. 3B depicts the mirror 410 as rotatable around the axis 415. In some embodiments of the invention the mirror 410 is rotatable around the axis 415, and also around a second axis (not shown), perpendicular to the first axis 415.

In some embodiments of the invention, the mirror 410 is placed at a symmetry location relative to the optical system which is used to project the image of the CGH. When the mirror 410 rotates, the optical paths of rays which project the image of the CGH do not change length, only direction.

In some embodiments of the invention, instances of the CGH are optionally produced so that when the mirror 410 rotates, the images of the CGH counteract the rotation, and the image optionally appears to be stationary.

In some embodiments of the invention, when the mirror 410 is jittered, or rotated, by a small angle, the image of the CGH appears to be static, while the speckles on the images move out of the observation window of the CGH.

Figure 4:
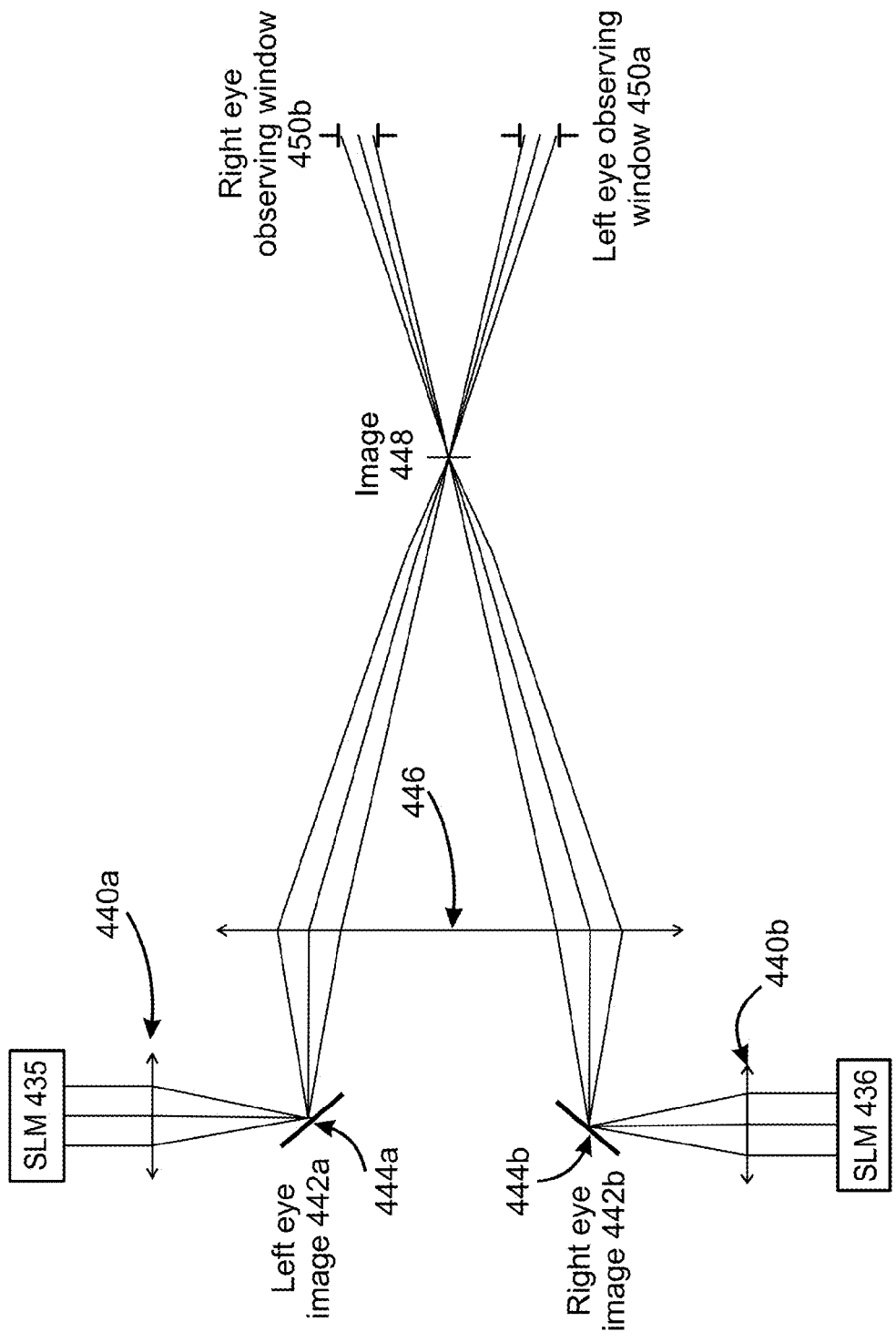
FIG. 4 is a simplified pictorial illustration of an example CGH projection system constructed according to an embodiment of the invention.

Reference is now made to FIG. 4, which is a simplified pictorial illustration of an example CGH projection system constructed according to an embodiment of the invention.

The example CGH projection system includes two SLMs 435 436, projecting images 442a 442b via optical components 440a 440b.

The images 442a 442b are reimaged via an optical system 446 to a location 448 of a second image.

FIG. 4 depicts the images 442a 442b optionally both reimaged at a same location 448, although other example embodiments may not reimage at a same location.

The example CGH projection system of FIG. 4 produce two observing windows 450a and 450b, optionally projected to a right eye (not shown) and a left eye (not shown).

Deflection mirrors 444a and 444b are optionally located at locations of the images 442a 442b. The deflection mirrors 444a and 444b are optionally jittered, optionally causing a direction of projection of the second image toward the right and left eyes to jitter.

The optional jittering optionally causes potential speckles in the first and second images to move out of the observing windows 450a 450b.

Example Embodiments of Shifting the Observation Window Using a Prism

In some embodiments of the invention, shifting an observation window is performed by a prism.

Reference is now made to FIG. 5A, which is a simplified illustration of what happens to light shining through a rotating prism.

FIG. 5A depicts a prism 610, having an axis of rotation 620.

FIG. 5A also depicts a beam of light 605 input into the prism 610. Optionally, the light 605 initially travels in a direction parallel to the axis of rotation 620. The light 605 passes into the prism 610 through a first face 611 of the prism 610 and out through a second face 612 of the prism 610. Due to an angle 615 between the first face 611 and the second face 612, direction of outgoing light 613 is shifted from its initial direction.

As the prism 610 rotates around its axis 620, the second face presents a different angle to the incoming light 605 (not shown), and the light is shifted to a different direction (not shown).

A rotating prism introduced into a path of light can shift the direction of the light according to the angle 615 between the faces of the prism 610 and the difference in index of refraction between the material of the prism 610 and the surrounding medium.

Reference is now made to FIG. 5B, which is a simplified illustration of a prism being used to shift an observation window of a CGH according to an example embodiment of the invention.

FIG. 5B depicts the rotating prism 610 of FIG. 5A, having an axis of rotation 620, inserted into an optical path of light 605 projected from a first real image (not shown), such as the first real image 205 of FIG. 2A. The rotating prism 610 causes the light direction from the first real image to shift direction to a different direction 613. The light goes through a second imaging system 630, and a second real image 640 is formed. Because of the rotating prism 610, the second real image 640 is projected from different directions corresponding to the rotation of the prism 610, causing a corresponding shift in an observation window 650 of the second real image 640. The observation window 650 sweeps an area larger than one static observation window, as depicted by two instances of the observation window, 650a and 650b, out of many possible observation windows in the sweep to the observation window 650 caused by the rotating prism 610.

When the rotating prism 610 is placed in the image plane of a first real image 606, as depicted in FIG. 5B, the second real image 640 does not noticeably shift laterally. The deflection of diffraction angles shifts the observing window 650 in two transverse dimensions.

Figure 5C:
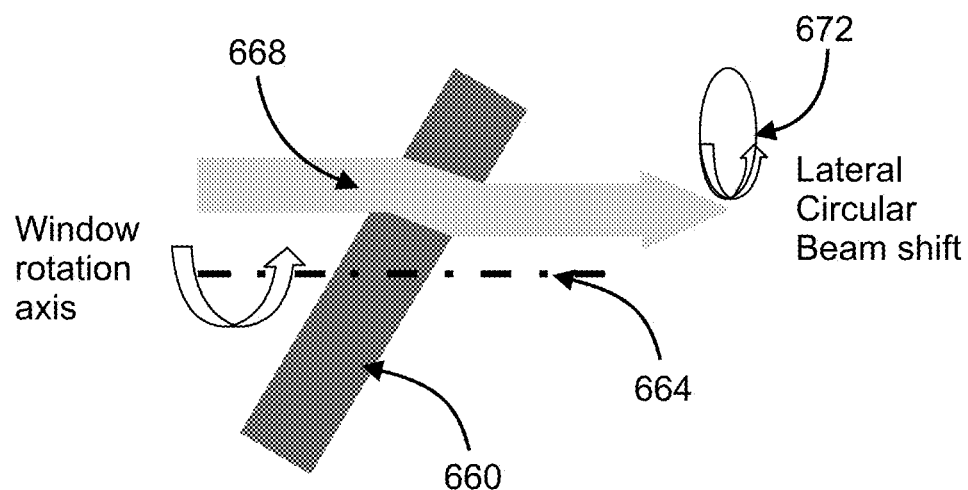
FIG. 5C is a simplified illustration of what happens to light shining through a tilted window.

Reference is now made to FIG. 5C, which is a simplified illustration of what happens to light shining through a tilted window 660.

FIG. 5C depicts a tilted window 660, having an axis of rotation 664. The window is termed tilted because the window is tilted relative to a direction in which an example beam of light 668 impinges upon the window 660.

FIG. 5C depicts the beam of light 668 input into the tilted window 660. Optionally, the beam of light 668 initially travels in a direction parallel to the axis of rotation 664. The beam of light 668 passes into the tilted window 660 through a first face of the tilted window 660 and out through a second face of the tilted window 660.

Due to an angle between the first face of the tilted window 660 and the beam of light 668, a direction of the beam of light 668 is shifted from its initial direction when the beam of light 668 enters the tilted window 660. As the beam of light exits from the tilted window 668 through the second face of the tilted window 660, the direction of the beam of light 668 is shifted in the opposite direction from the shift upon entering. However, a result of passing the two faces of the tilted window is a lateral shift for the beam of light 668.

As the tilted window 660 rotates around its axis 664, the beam of light 668 is shifted laterally, and a point in the beam of light 668 describes a circular path 672.

Figure 5D:
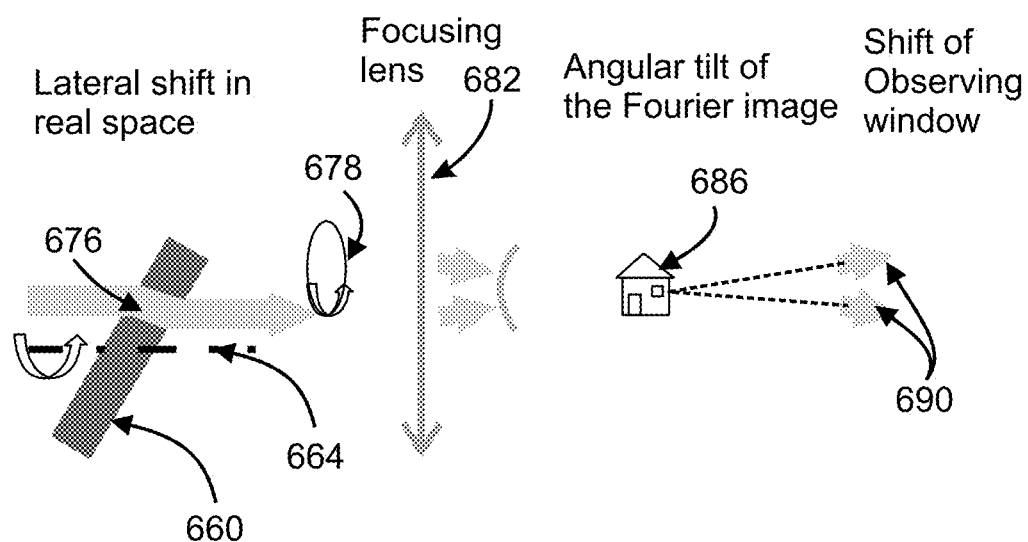
FIG. 5D is a simplified illustration of a tilted window being used to shift an observation window of a CGH according to an example embodiment of the invention.

Reference is now made to FIG. 5D, which is a simplified illustration of a tilted window 660 being used to shift an observation window of a CGH according to an example embodiment of the invention.

FIG. 5D depicts the tilted window 660 of FIG. 5C, having an axis of rotation 664, inserted into an optical path of light 676 projected from an SLM (not shown). The rotating tilted window 660 causes the light direction from the SLM to shift laterally, as depicted by a circular path 678. The light goes through an imaging system, depicted by an example focusing lens 682, and an image 686 is formed. Because of the rotating tilted window 660, which causes the lateral shift, the image 686 is projected onward in different directions 690 corresponding to the rotation of the tilted window 660 and the lateral shift caused by the rotation, causing a corresponding shift in an observation window (not shown) of the second real image 686.

Some example embodiments of the invention are now described in terms of a method for despeckling a computer generated hologram.

Figure 6:
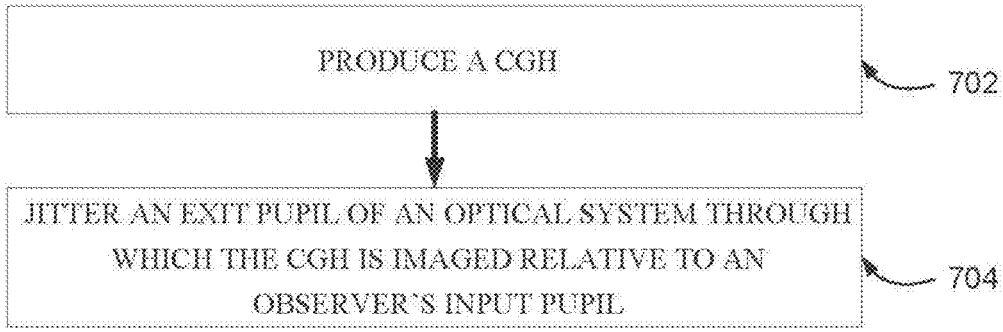
FIG. 6 is a simplified flow chart illustration of a method for despeckling a Computer Generated Hologram (CGH) according to an example embodiment of the invention.

Reference is now made to FIG. 6, which is a simplified flow chart illustration of a method for despeckling a Computer Generated Hologram (CGH) according to an example embodiment of the invention.

The method depicted in FIG. 6 includes:
producing a CGH (702),
jittering an exit pupil of an optical system through which the CGH is imaged relative to an observer's input pupil (704), so as to shift at least some speckles out of the exit pupil.

In some embodiments, an image of the CGH appears to the observer in the same viewing direction when the observation window moves across the observer's input pupil.

In some embodiments, projection optics of the CGH are configured so that the observation window of the CGH is larger than an observer's input pupil.

In some embodiments, the moving includes sweeping the observation window across an observer's input pupil.

In some embodiments producing the CGH is done by projecting coherent light onto a computer controlled Spatial Light Modulator (SLM), thereby modulating the coherent light.

In some embodiments of the invention the cyclically deflecting comprises rotating a mirror to cyclically deflect the direction of projecting the CGH.

In some embodiments of the invention the cyclically deflecting comprises rotating a prism to cyclically deflect the direction of projecting the CGH.

In some embodiments of the invention the deflection movement is not cyclical.

Figure 7:
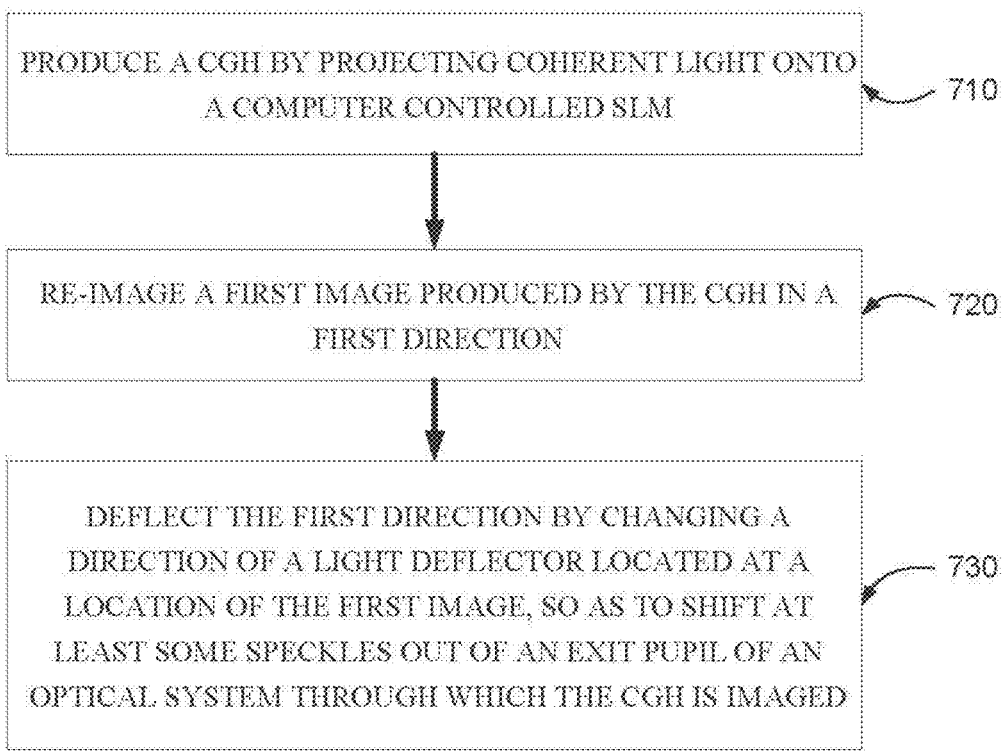
FIG. 7 is a simplified flow chart illustration of a method for despeckling a Computer Generated Hologram (CGH) according to another example embodiment of the invention.

Reference is now made to FIG. 7, which is a simplified flow chart illustration of a method for despeckling a Computer Generated Hologram (CGH) according to another example embodiment of the invention.

The method depicted in FIG. 7 includes:

producing a CGH by projecting coherent light onto a computer controlled Spatial Light Modulator (SLM) (710), thereby modulating the coherent light and producing a CGH;

re-imaging a first image produced by the CGH in a first direction (720); and deflecting the first direction by changing a direction of a light deflector located at a location of the first image (730).

In some embodiments of the invention the light deflector is a mirror.

In some embodiments of the invention the cyclically deflecting comprises cyclically deflecting the direction in one dimension.

In some embodiments of the invention the cyclically deflecting comprises cyclically deflecting the direction in two dimensions.

In some embodiments of the invention the cyclically deflecting comprises cyclically deflecting the direction in three dimensions.

In some embodiments of the invention for each one of a plurality of different deflected instances of the first direction, a different CGH is produced by the SLM, so as to project a same scene viewed from a corresponding deflected instance of the first direction.

In some embodiments of the invention the light deflector is a prism located between the image and an observing window.

In some embodiments of the invention, where the SLM produces is a Fourier hologram, the light deflector is optionally a tilted optical window located after the SLM, or at a plane of a real image of the optical system.

In some embodiments of the invention the CGH is of a shell of a three dimensional object.

In some embodiments of the invention the deflecting is by an angle smaller than a threshold angle, the modulation of the light by the SLM is not changed to compensate for the change in direction.

In some embodiments of the invention the SLM is controlled so as to produce a CGH of a shell relative to an observation point at an approximate distance of an observing window.

In some embodiments of the invention the SLM is controlled so as to produce a CGH of a shell relative to a vector.

Example Embodiments of Despeckling by Changing the Source of the Speckles

In some embodiments of the invention, different CGHs of the same scene are produced, each with a different SLM pattern, so that different speckle patterns are produced superimposed on a same scene. Rapidly changing between displaying the different CGHs makes the speckle patterns average out, while viewing the same scene in the different CGHs provides a bright image to a viewer.

In some embodiments of the invention computing a phase modulation for the SLM is performed by:

(a) computing, at an image plane, an initial amplitude distribution which corresponds to a desired image, having some phase distribution. The initial amplitude and phase distribution is computed back through the optical system to a plane of a generating SLM, producing an initial amplitude and phase distribution at the SLM;

(b) taking the phase distribution only at the SLM plane, and computing forward through the optical system to the plane of the image, producing an image having an amplitude and phase distribution. At this point the amplitude distribution is not necessarily the desired amplitude distribution, since the amplitude was changed (dropped) at the SLM;

Iterating the above steps (a) and (b) until the phase distribution at the SLM produces an amplitude distribution at the image plane which is acceptably close to the desired amplitude distribution.

In some embodiments of the invention acceptably close is defined as having every pixel of the amplitude distribution at the image plane at less than a threshold amplitude difference from every corresponding pixel of the desired amplitude distribution.

In some embodiments of the invention the initial phase distribution at the image plane is a random phase distribution.

In some embodiments of the invention the initial phase distribution at the image plane is a phase distribution having just one phase value or just a few phase values.

In some embodiments of the invention two or more different SLM phase modulations are computed for a same scene, and the different spatial modulations are alternately used to produce a CGH. The different spatial modulations produce different speckle patterns, which average out, while the image remains bright and sharp.

Figure 8:
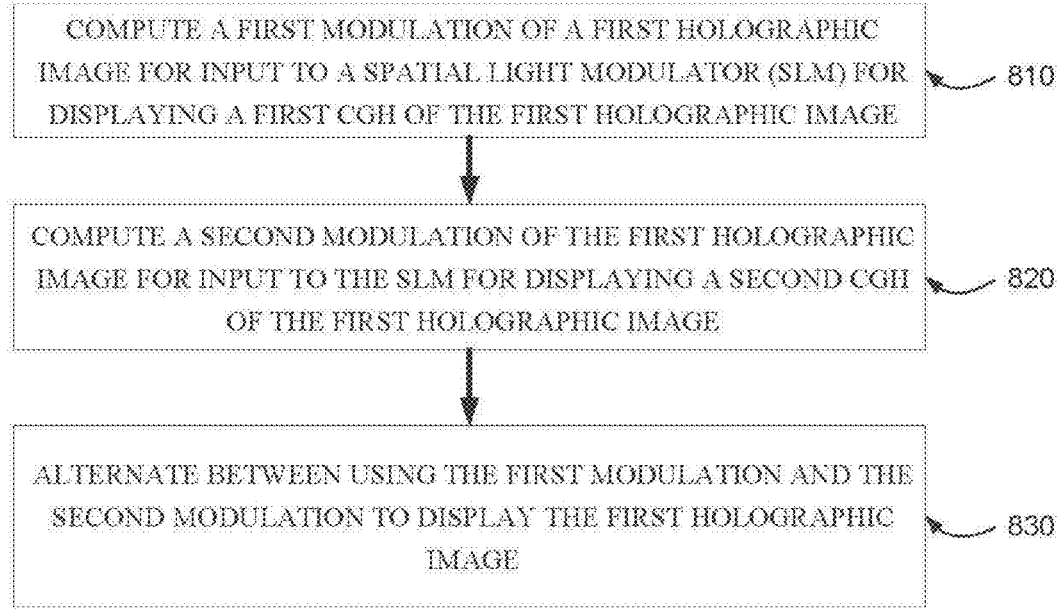
FIG. 8 is a simplified flow chart illustration of a method for despeckling a Computer Generated Hologram (CGH) according to yet another example embodiment of the invention.

Reference is now made to FIG. 8, which is a simplified flow chart illustration of a method for despeckling a Computer Generated Hologram (CGH) according to yet another example embodiment of the invention.

The method depicted in FIG. 8 includes:

computing a first modulation of a first holographic image for input to a Spatial Light Modulator (SLM) for use in displaying a first CGH of the first holographic image (810);

computing a second modulation of the first holographic image for input to the SLM for use in displaying a second CGH of the first holographic image (820); and alternating between using the first modulation and the second modulation in order to display a CGH of the first holographic image (830).

Computing different modulation patterns of a same object or scene may be computationally intensive.

In some embodiments of the invention, when computing a new SLM phase modulation pattern in order to produce a same image, the initial phase modulation at the image plane is taken from the initial phase modulation at the image plane which was used to produce an acceptable amplitude distribution at the image plane. Starting at this phase modulation potentially provides a saving in the number of iterations required to produce an amplitude distribution at the image plane which is acceptably close to the desired amplitude distribution.

In some embodiments of the invention, when computing a new SLM phase modulation pattern in order to produce a same image, the initial phase distribution at the image plane is taken from an acceptable phase distribution of a previous phase modulation at the image plane. Starting at this phase modulation potentially provides a saving in the number of iterations required to produce an amplitude distribution at the image plane which is acceptably close to the desired amplitude distribution.

FIG. 8 depicted a flow chart where two modulations were alternated to produce one image, with two different speckle patterns.

In some embodiments of the invention more than two modulations are iterated, to produce one image with many different speckle patterns. The one image is optionally seen as a steady, bright image, while the changing speckle patterns average out to be weak noise on the bright image.

In some embodiments of the invention a series of modulations is produced by computing a first basic modulation for producing a CGH of a desired scene or object, then modifying the first basic modulation by computing an effect of a mirror and/or a prism in the optical path of the scene/object on the first basic modulation. A series of modulations is optionally produced by computing the effect of the mirror and/or prism at different angles of the mirror and/or prism. The series of spatial modulations can optionally save using a component in the optical path of the CGH, such as a vibrating mirror or rotating prism, by computing the effect of the components and reproducing the effect by changing the spatial modulation.

Example Embodiments of Despeckling a CGH Movie

In some embodiments of the invention, the CGH changes over time, showing successive CGHs of a moving object, similar to frames in a movie or video. Changing SLM modulations between successive CGHs, especially when specific pixels need to make a large change in their modulation property (e.g. a large phase change), may cause appearance of speckles. The pixels requiring a large change may not be able to complete the change between successive CGHs, and pixels which do not reach their required value may produce speckles.

In some embodiments, successive SLM modulations, for producing successive CGHs, are computed so as to minimize changes in pixels between modulations.

In some embodiments, an initial modulation used in computing a spatial modulation for producing of a first CGH is used as an initial modulation in computing a spatial modulation for producing a successive CGH.

Figure 9:
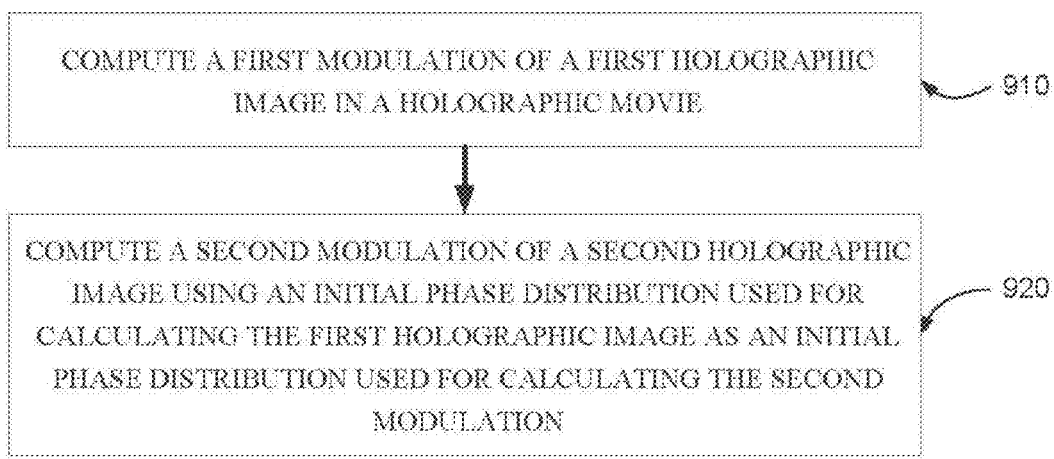
FIG. 9 is a simplified flow chart illustration of a method for despeckling a Computer Generated Holographic movie according to still another example embodiment of the invention.

Reference is now made to FIG. 9, which is a simplified flow chart illustration of a method for despeckling a Computer Generated Holographic movie according to still another example embodiment of the invention.

The method depicted in FIG. 9 includes:

computing a first modulation of a first holographic image in a holographic movie (910); and computing a second modulation of a second holographic image using an initial phase distribution used for calculating the first holographic image as an initial phase distribution used for calculating the second modulation (920).

It is expected that during the life of a patent maturing from this application many relevant Spatial Light Modulators (SLMs) will be developed and the scope of the term SLM is intended to include all such new technologies a priori.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example" or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for despeckling a Computer Generated Holographic (CGH) image comprising:
   producing a CGH image;
   projecting the CGH image toward an observer location, thereby producing an observation window from which the CGH image may be viewed; and
   jittering a location of the observation window, relative to the observer location, by jittering an element in the optical system projecting the CGH image, so as to shift at least some speckles out of an observer's input pupil,
   in which the producing the CGH image comprises producing the CGH image at an axis of rotation of the jittered element in the optical system.

2. The method of claim 1, in which the jittering comprises jittering the location of the observation window laterally relative to a direction of projection of the CGH image.

3. The method of claim 1, in which the jittering comprises jittering the observation window along a direction of projection of the CGH image.

4. The method of claim 1, in which a computer generated hologram is calculated to produce the CGH image as to appear to the observer to be located in the same location when the observation window is jittered across the observer's input pupil.

5. The method of claim 1, and further comprising configuring projection optics of the optical system through which the CGH image is imaged so that the observation window is larger than the observer's input pupil.

6. The method of claim 1, in which the jittering comprises jittering the observation window across the observer's input pupil.

7. The method of claim 6, in which the jittering scans across the observer's input pupil at a rate greater than 1 time per second.

8. The method of claim 6, in which the jittering scans across the observer's input pupil at a rate which is coordinated with a CGH image production rate.

9. The method of claim 1, in which the observer's input pupil is a pupil of an eye of the observer.

10. The method of claim 1, in which the observer is an additional optical system and the observer's input pupil is an input pupil of the additional optical system.

11. The method of claim 1 in which the producing the CGH image comprises projecting coherent light onto a computer controlled Spatial Light Modulator (SLM), thereby modulating the coherent light and producing the CGH image.

12. The method of claim 1, in which the jittering comprises jittering the element in the optical system in two dimensions.

13. A method for despeckling a Computer Generated Holographic (CGH) image comprising:
    producing a CGH image;
    projecting the CGH image toward an observer location, thereby producing an observation window from which the CGH image may be viewed; and
    jittering a location of the observation window, relative to the observer location, by jittering an element in the optical system projecting the CGH image, so as to shift at least some speckles out of an observer's input pupil,
    in which the CGH image is produced by a computer generated Fourier hologram, and the element in the optical system is a tilted optical window located at a location of the CGH image.

14. A method for despeckling a Computer Generated Holographic (CGH) image comprising:
    producing a CGH image;
    projecting the CGH image toward an observer location, thereby producing an observation window from which the CGH image may be viewed; and
    jittering a location of the observation window, relative to the observer location, by jittering an element in the optical system projecting the CGH image, so as to shift at least some speckles out of an observer's input pupil,
    in which:
    the producing the CGH image comprises projecting coherent light onto a computer controlled Spatial Light Modulator (SLM), thereby modulating the coherent light and producing the CGH image; and
    the modulation of the light by the SLM is not changed to compensate for the jittering the location.

15. The method of claim 11, in which the SLM is controlled so as to produce a CGH image of a hologram calculated to display a shell relative to a far distant viewer.

16. The method of claim 11, in which the SLM is controlled so as to produce a CGH of a shell relative to an observation point at an approximate distance of an observing window.

17. Apparatus for despeckling a Computer Generated Holographic (CGH) image, comprising:
    a computer controlled Spatial Light Modulator (SLM) for modulating coherent light and producing a first CGH image at a first location;
    an optical system for reimaging the first CGH image from the first location to a second location and imaging an image of the SLM as an observation window;
    a light deflector placed at the first location of the first CGH image for jittering the observation window, so as to shift at least some speckles out of an observer's input pupil,
    in which the light deflector is placed at a symmetry location of the optical system for re-imaging the first CGH image.

18. The apparatus of claim 17, in which the light deflector is located at a location of the first image.

19. The apparatus of claim 17, in which the light deflector is adapted to deflect light in three dimensions.

20. The apparatus of claim 17, and further comprising a control unit configured to accept a specific amount of speckle attenuation and to control the light deflector to provide the specific amount of attenuation by calculating an average of a fraction of a time speckles in the CGH image are inside the input pupil of the observer.

21. The method of claim 1 in which the jittering the location of the observation window comprises jittering a direction of a light deflector located at a location of the CGH image.

22. The method of claim 1 in which:
    the jittered element is a mirror:
    the axis of rotation is an axis of rotation of the mirror; and
    producing the CGH image at an axis of rotation of the jittered element in the optical system comprises projecting a center of the CGH image to coincide with the axis of rotation of the mirror.

* * * * *